(12) United States Patent
Hwang et al.

(10) Patent No.: US 12,007,994 B1
(45) Date of Patent: Jun. 11, 2024

(54) PARTITION GRANULAR SELECTIVITY ESTIMATION FOR PREDICATES

(71) Applicant: Snowflake Inc., Bozeman, MT (US)

(72) Inventors: Sangyong Hwang, Sammamish, WA (US); Adem Khachnaoui, Munich (DE); Li Yan, Redmond, WA (US); Yongsik Yoon, Sammamish, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/362,369

(22) Filed: Jul. 31, 2023

(51) Int. Cl.
*G06F 16/22* (2019.01)
*G06F 11/34* (2006.01)
*G06F 16/2453* (2019.01)

(52) U.S. Cl.
CPC .... *G06F 16/24544* (2019.01); *G06F 11/3452* (2013.01); *G06F 16/2282* (2019.01)

(58) Field of Classification Search
CPC .................. G06F 16/24542; G06F 16/2455

USPC ......................................................... 707/714
See application file for complete search history.

(56) References Cited

U.S. PATENT DOCUMENTS

| | | | |
|---|---|---|---|
| 8,090,974 B1 * | 1/2012 | Jain ..................... | H04L 41/5054 |
| | | | 714/39 |
| 11,216,457 B1 * | 1/2022 | Pandis ................... | G06F 16/22 |
| 2004/0243555 A1 * | 12/2004 | Bolsius ............ | G06F 16/24547 |
| 2009/0063396 A1 * | 3/2009 | Gangarapu ......... | G06F 16/2228 |

\* cited by examiner

*Primary Examiner* — Hung T Vy
(74) *Attorney, Agent, or Firm* — Schwegman Lundberg & Woessner, P.A.

(57) ABSTRACT

A query engine can use partition-granular level statistics to optimize query performance. A query can reference a table with a plurality of partitions and include a predicate. A partition-granular selectivity estimate for the predicate can be generated based on statistics stored regarding the plurality of partitions of the table. A query plan can be generated based on partition-granular selectivity estimate to optimize query processing.

21 Claims, 12 Drawing Sheets

PARTITION GRANULAR SELECTIVITY ESTIMATION FOR PREDICATES

TECHNICAL FIELD

The present disclosure generally relates to data systems, such as data warehouses, and, more specifically, to query optimization.

BACKGROUND

As the world becomes more data driven, database systems and other data systems are storing more and more data. For a business to use this data, different operations or queries are typically run on this large amount of data. Executing queries over large amounts of data can involve long processing times.

Using statistical data for table data in the query compilation can improve query execution. However, with the sizes of tables increasing, statistics of an entire table can be misleading and slow down query compilation. One approach is to build histograms of the data. However, this approach can be expensive to build, and the histograms need to be managed separately and updated when data changes. Another approach is data sampling; however, this approach may require running additional queries to obtain the data sampling, which increases overhead cost and time.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Described herein are techniques for improved query optimization in a network-based data system. Tables can include a large amount of data stored in different partitions. Techniques for calculating and utilizing partition-granular selectivity estimation for predicates, such as SQL predicates, are described. Instead of using only table-granular selectivity estimation, the data system can determine one or more partition-granular selectivity estimation using the techniques described herein. The fine granular statistics from the table partitions can be combined to provide a more accurate table-level estimation. The fine granular statistics can be used to optimize query plans used to execute queries over large tables to improve query processing efficiency and reduce computational cost and time.

Figure 1:
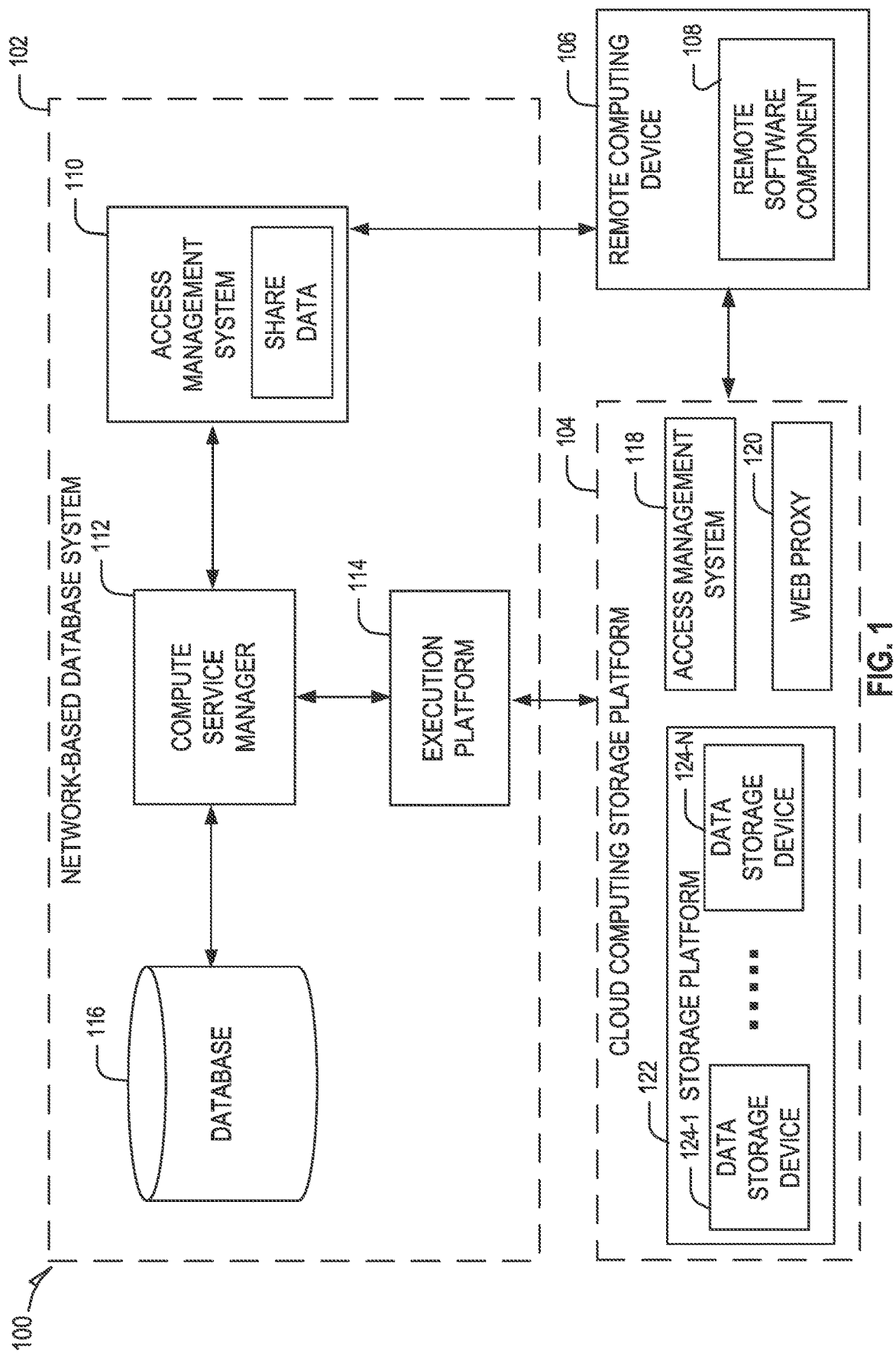
FIG. 1 illustrates an example computing environment, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based database system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based database system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
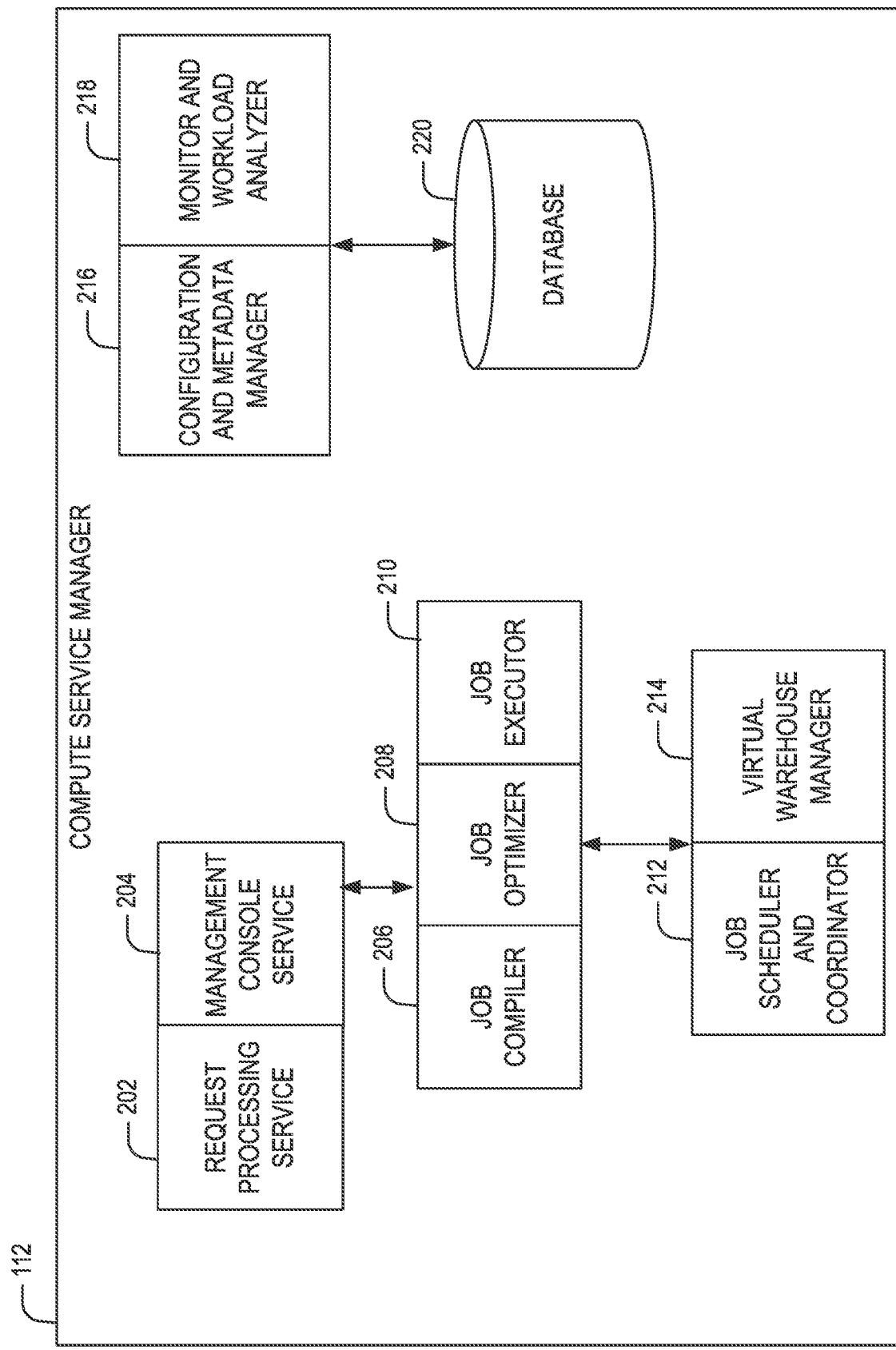
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represents any data storage device within the network-based database system 102. For example, data storage device 220 may represent caches in execution platform 114, storage devices in cloud computing storage platform 104, or any other storage device. Moreover, the compute service manager 112 may include a query compiler and optimizer to perform query optimization techniques described in further detail below.

Figure 3:
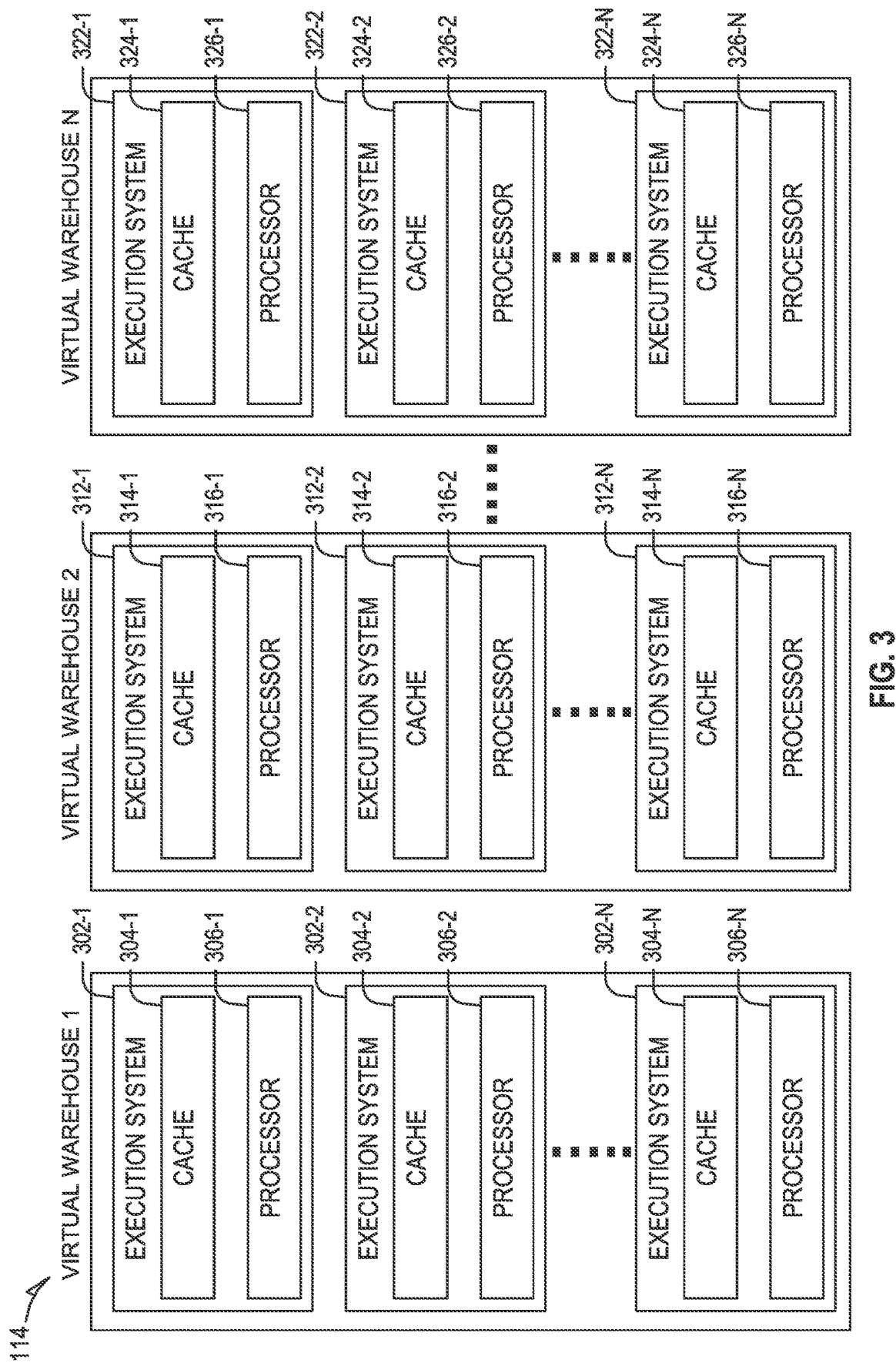
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Data sets stored in the network-based data system can become quite large. The data sets, such as tables, can be stored and maintained in partitions. For example, data in a table may automatically be divided into an immutable storage device referred to as a micro-partition (also referred to as a partition). A micro-partition may be an immutable storage device in a database table that cannot be updated in-place and must be regenerated when the data stored therein is modified. A micro-partition may be considered a batch unit where each micro-partition has contiguous units of storage. By way of example, each micro-partition may contain between 50 MB and 500 MB of uncompressed data (note that the actual size in storage may be smaller because data may be stored compressed).

Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for optimization and efficient query processing, as described in further detail below.

In some embodiments, micro-partitioning may be automatically performed on all tables. For example, tables may be transparently partitioned using the ordering that occurs when the data is inserted/loaded. When new data is written, a new micro-partition is created and replaces an older micro-partition. Background file deleting operations can be performed to delete older micro-partitions that have been replaced. However, it should be appreciated that this disclosure of the micro-partition is exemplary only and should be considered non-limiting. It should be appreciated that the micro-partition may include other database storage devices without departing from the scope of the disclosure.

Query compilation can include parsing, type check, optimization, and code generation. Query compilation typically involves receiving, by a compute service manager as described herein, a query, such as a SQL (Structured Query Language) statement, and generating a query execution plan (also referred to as a query plan), such as a SDL (Schema Dataflow Language) statement, which can then be executed by one or more execution platforms (XPs). The query execution plan can include a representation of an execution graph where nodes describe operations for execution. To generate this form of a query execution plan, query compilation can include a plurality of stages and rewrite rules to produce optimized execution plans.

In some systems, a query engine can gather relevant statistics of referenced objects in a query, such as tables, and use those statistics to optimize the query plan. For example, filter selectivity estimation can be used for determining the join order in a SQL query, which can significantly impact the query performance. These systems typically estimate filter selectivity using statistics in table granularity, such as looking at statistics for the whole data set, and assuming a uniform distribution. However, such table granularity statistics, especially for large or non-uniform data sets, can lead to significant mis-estimation in case of skewed data or data correlations.

Next, techniques for calculating and utilizing partition-granular selectivity estimation for predicates, such as SQL predicates, are described. Instead of using only table-granular selectivity estimation, the data system can determine one or more partition-granular selectivity estimation using the techniques described herein. The fine granular statistics from the table partitions can be combined to provide a more accurate table-level estimation.

Figure 4:
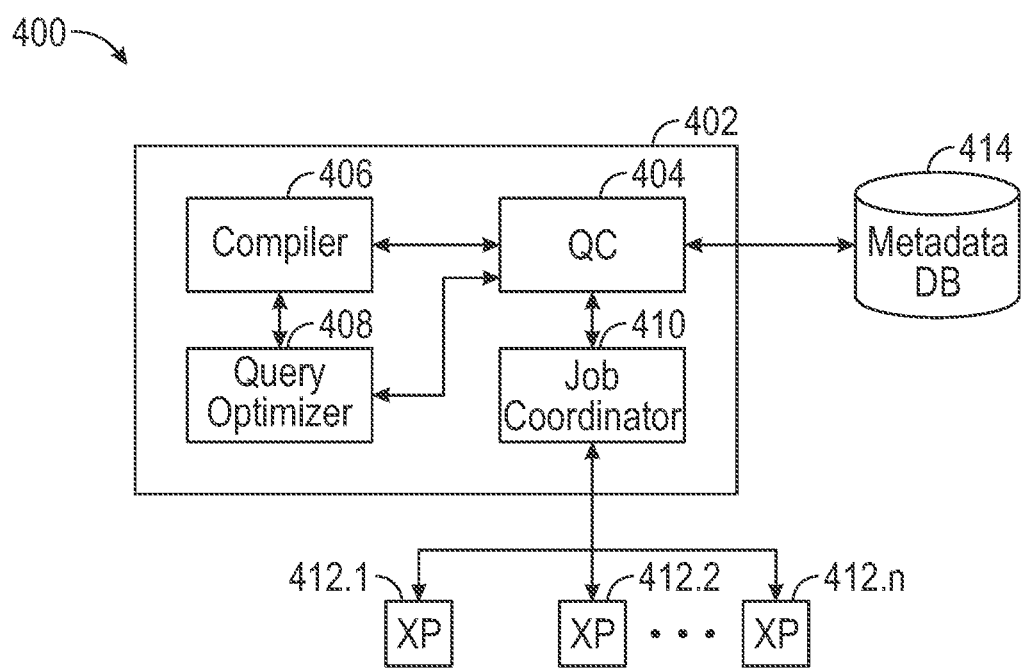
FIG. 4 is a simplified block diagram of a query engine infrastructure utilizing partition-granular selectivity estimation, according to some example embodiments.

FIG. 4 is a simplified block diagram of a query engine infrastructure 400 utilizing partition-granular selectivity estimation, according to some example embodiments. The query engine infrastructure 400 may include a compute service manager 402 to receive and process a query. The compute service manager 402 may be provided as described above with reference to FIGS. 1-3 (e.g., compute service manager 112). As relevant to using partition-granular statistic techniques, the compute service manager 402 may include a query coordinator 404, a compiler 406, a query optimizer 408, and a job coordinator 410 (also referred to as a job scheduler). In some embodiments, the components may be distributed across multiple compute service managers. For example, the query coordinator 404, compiler 406, and query optimizer 408 may be provided in a first compute service manager, and the job coordinator may be provided in a second compute service manager.

The query coordinator 404 may orchestrate compilation and execution of queries. The query optimizer 408 may optimize query plans based on optimization rules and statistics of objects, such as tables, referenced in the query. The compute service manager 402 may communicate with a metadata DB 414, which may store metadata. The metadata may include table properties, statistics (stats), and other information. The metadata may include expression properties (EP) of tables and partitions of tables. For example, EP files for tables/partitions can include the range of values for each of the columns in the partition/table (e.g., min/max values); the number of distinct values (NDV); null count, and/or additional properties used for optimization and efficient query processing, as described in further detail below.

The query coordinator 404 may also communicate with the job coordinator 410 to schedule jobs related to execution of queries. The job coordinator 410 may schedule jobs with a plurality of execution platforms (XPs) 412.1-412.$n$ to execute the assigned jobs.

The query optimizer 408 may use table-granular statistics and partition-granular statistics to optimize query processing, as described in further detail below. The query optimizer 408 may create or modify a query plan based on the table-granular and partition-granular statistics. For example, a predicate, which can be a Boolean expression, in a query plan can be executed more efficiently based on statistics of the table(s) on which the predicate is being evaluated. For example, filter selectivity estimation uses the estimation of the output to input cardinality ratio of a filter predicate using statistics of the table.

Figure 5A:
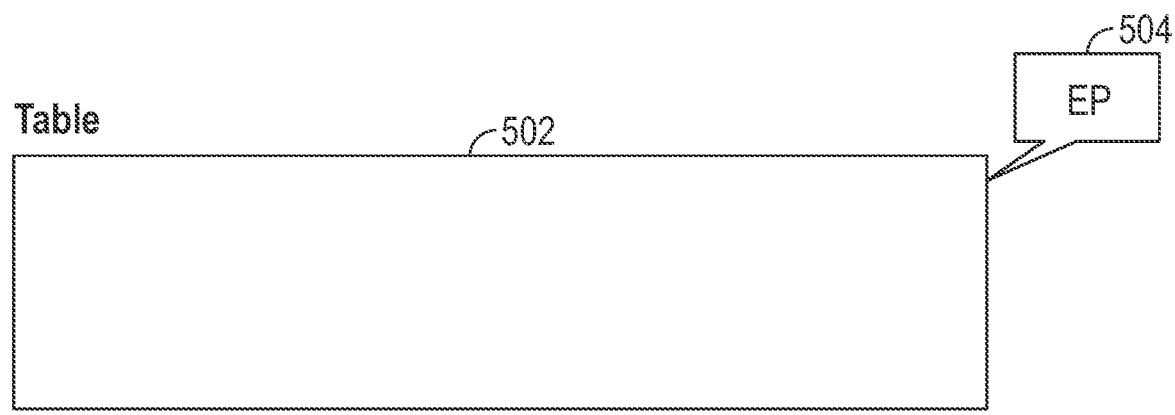
FIG. 5A illustrates an example of a table using only table-granular statistics, according to some example embodiments.

FIG. 5A illustrates an example of a table using only table-granular statistics, according to some example embodiments. Table 502 is associated with an EP file 504, which includes statistics of the entire data set in table 502. For example, EP file 504 may include min/max values, NDV, null count, and additional properties for table 502. Consider P to represent a predicate, such as a filter predicate. The selectivity estimation of the predicate (sel) associated with the table 502 can be represented as:

$$sel(P) = sel(P, EP)$$

where EP represents the statistics of the entire table 502 in EP file 504.

However, as mentioned above, a table may include a large amount of data maintained in a plurality of partitions. Moreover, the data may not be uniformly distributed and include skews. EP files may also be maintained for the partitions of the tables.

Figure 5B:
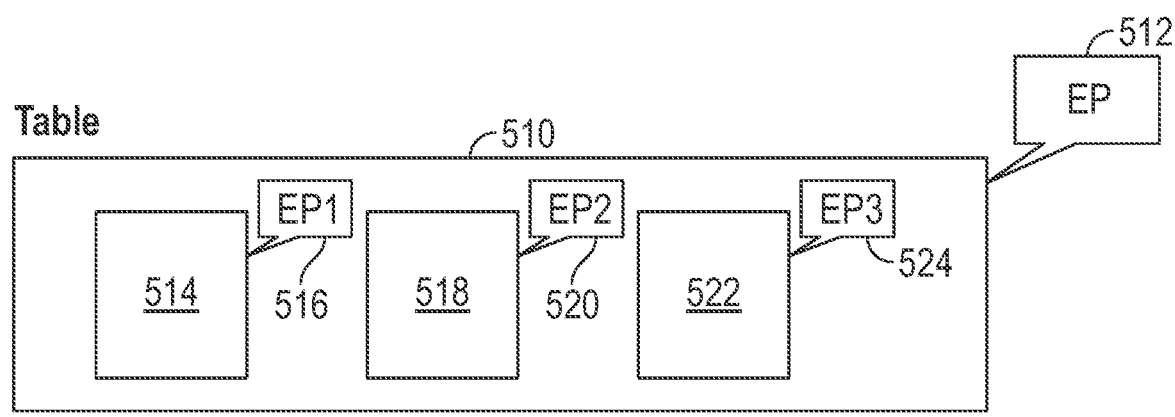
FIG. 5B illustrates an example of a table using partition-granular statistics, according to some example embodiments.

FIG. 5B illustrates an example of a table using partition-granular statistics, according to some example embodiments. Table 510 is associated with an EP file 512, which includes statistics of the entire table 510. For example, EP file 512 may include min/max values, NDV, null count, and additional properties. Also, table 510 includes a plurality of partitions with respective EP files. Partition) 514 is associated with EP1 file 516, which includes statistics of partition) 514, such as min/max values, NDV, null count, and additional properties. Likewise, partition2 518 and partition3 522 are associated with EP2 file 520 and EP3file 524, respectively, which includes statistics of the respective partitions, such as min/max values, NDV, null count, and additional properties.

The additional EP information in the partition EP files can be used to determine a more accurate selectivity estimation of the table 510. Consider P to represent a predicate, such as a filter predicate. The selectivity estimation of the predicate (sel) associated with the table 510 can be represented as:

$$sel(P) = \frac{sel(P, EP1) * rowCount1 + sel(P, EP2) * rowCount2 + sel(P, EP3) * rowCount + \ldots sel(P, EPn) * rowCountn}{rowCount1 + rowCount2 + rowCount4 + \ldots rowCountn} \quad \text{(formula 1)}$$

where rowCount1 represents the number of rows in partition) 514, rowCount2 represents the number of rows in partition2 518, rowCount3 represents the number of rows in partition3 522, and rowCountn represents the number of rows in partition n (last partition).

Figure 6A:
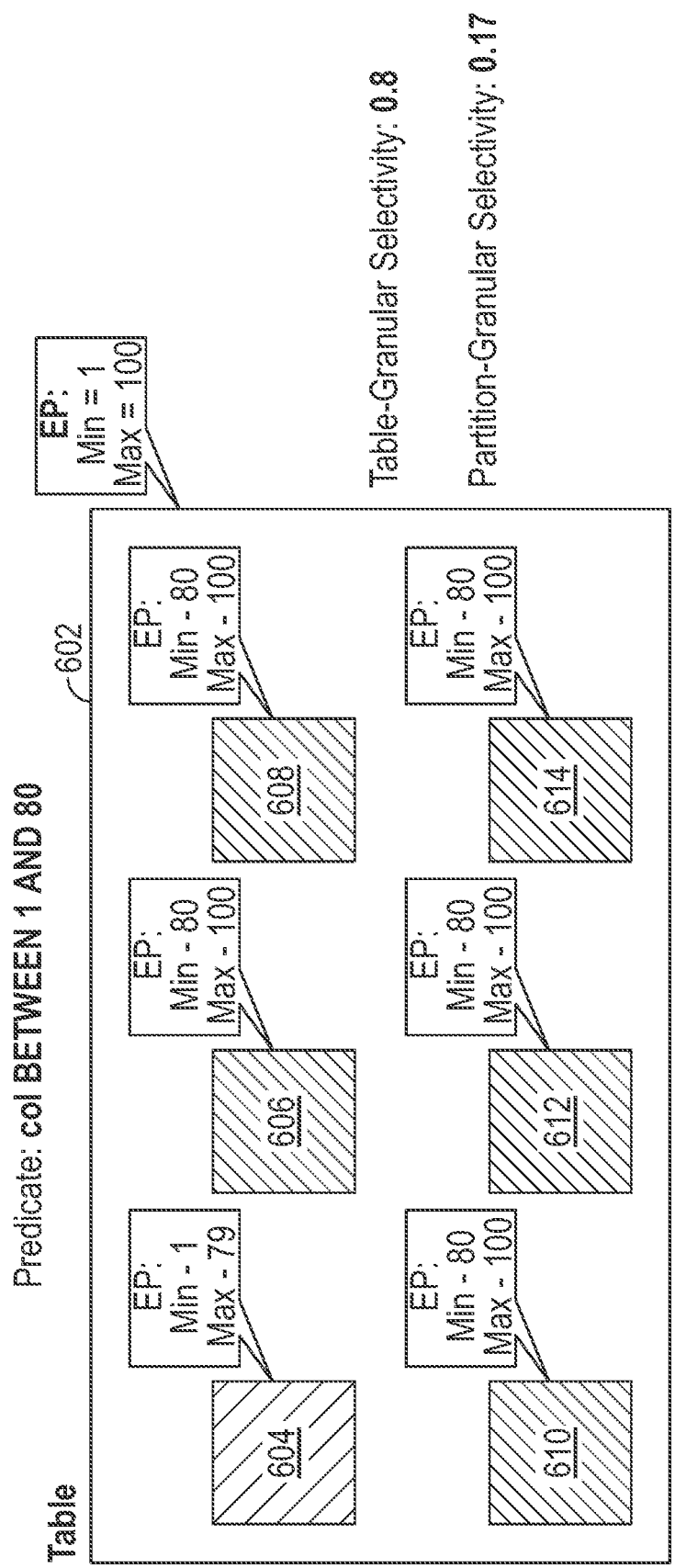
FIG. 6A shows an example of using table-granular selectivity estimation and partition-granular selectivity estimation, according to some example embodiments.

Let's consider two examples showing how using partition-granular statistics can provide more accurate selectivity estimations. For simplicity, the examples below assume that the partitions have the same row count. FIG. 6A shows an example of using table-granular selectivity estimation and partition-granular selectivity estimation, according to some example embodiments. A table 602 is provided having EP of min=1 and max=100. A predicate of a column between 1 and 80 is considered. If table-granular statistics are used, the table-granular selectivity estimation is determined to be 0.8. In other words, about 80% of the rows should be applicable to the predicate based on the estimation.

However, when partition-granular statistics are used, it shows that the table-granular selectivity estimation is a vast over estimation in this case. In this example, table 602 includes six partitions (partitions 604, 606, 608, 610, 612, 614). Partition 604 is provided having EP of min=1 and max=79. The remaining partitions 606, 608, 610, 612, 614 are provided having respective EPs of min=80 and max=100. The same predicate of a column between 1 and 80 is considered. Now, if partition-granular statistics are used, the partition-granular selectivity estimation is determined to be 0.17, which is much lower than the 0.80 table-granular selectivity estimation and better approximates the actual selectivity of the predicate.

Figure 6B:
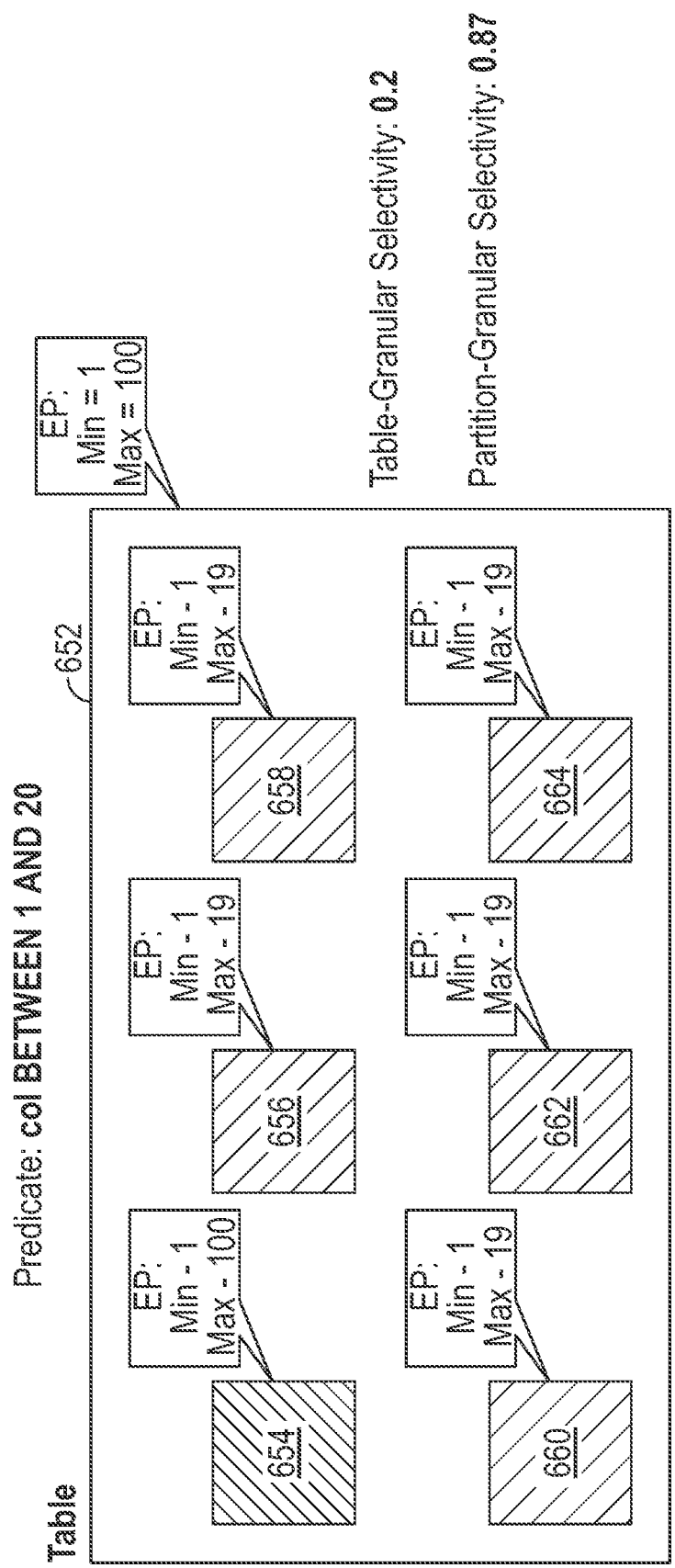
FIG. 6B shows another example of using table-granular selectivity and partition-granular selectivity, according to some example embodiments.

FIG. 6B shows another example of using table-granular selectivity and partition-granular selectivity, according to some example embodiments. A table 652 is provided having EP of min=1 and max=100. A predicate of a column between 1 and 20 is considered. If table-granular statistics are used, the table-granular selectivity estimation is determined to be 0.2. In other words, about 20% of the rows should be applicable to the predicate based on the estimation.

However, when partition-granular statistics are used, it shows that the table-granular selectivity estimation is a vast under estimation in this case. In this example, table 652 includes six partitions (partitions 654, 656, 658, 660, 662, 664). Partition 654 is provided having EP of min=1 and max=100. And the remaining partitions 656, 658, 660, 662, 664 are provided having respective EP of min=1 and max=19. The same predicate of a column between 1 and 20 is considered. Now, if partition-granular statistics are used, the partition-granular selectivity estimation is determined to be 0.87, which is much higher than the 0.20 table-granular selectivity estimation.

Figure 7:
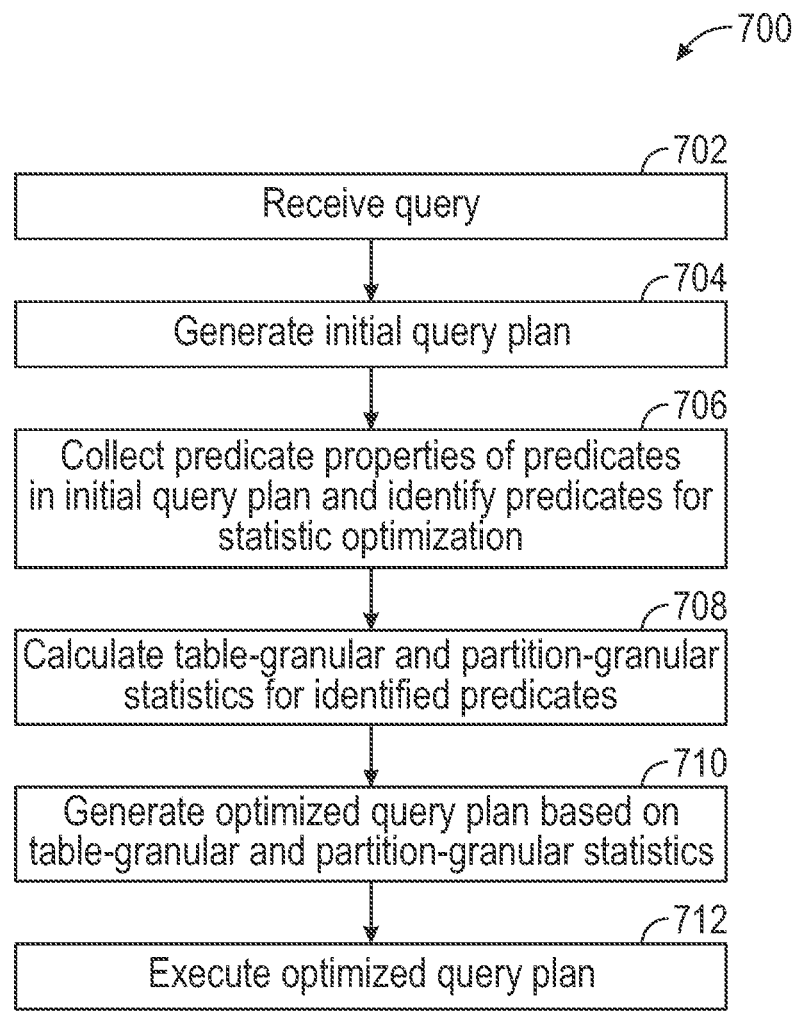
FIG. 7 illustrates a flow diagram of a method 700 for executing a query using partition-granular selectivity, according to some example embodiments.

FIG. 7 illustrates a flow diagram of a method 700 for executing a query using partition-granular selectivity, according to some example embodiments. At operation 702, a statement to be executed is received by a compute service manager. The statement can be a query, DML statement, or the like.

At operation 704, an initial query plan may be generated by the compute service manager. In some embodiments, a compiler in the compute service manager may collect information associated with the statement. For example, the compiler may collect information, such as query type, feature set (e.g., external table reference, sub-query nesting, user defined function (UDF) inclusion, types of table(s) indicated), and query plan properties. For example, query plan properties may be collected by gathering a list of classes (e.g., SqlExpression classes) referenced in the query plan by traversing the nodes in the plan. SqlExpression includes base call of expressions, which evaluate to a value in the parse tree and the query plan.

At operation 706, predicate properties of predicates in the initial query plan may be collected and predicates whose processing can be optimized using statistics may be identified. The predicate properties, such as the Boolean expression, may be compared to a list of predicates supported by statistical optimization. In some embodiments, the system may have the capability of optimizing processing of certain predicates using statistical properties of objects, such as tables, but not other predicates. The system may check if the predicate is appropriate or valid for partition-granular selectivity estimation. The system may check if the predicate contains a path from the predicate root to a column reference that only contains functions that support partition-granular selectivity estimation (e.g., Boolean functions) or range derivation for partition-granular selectivity estimation.

For example, if a predicate is a null-sensitive predicate, then the system may identify it as a predicate that can be optimized using table statistics (including partition granular statistics), such as null counts. If a predicate is supported by statistical optimization, the system may perform statistical optimization as described in the next steps. If a predicate is not supported by statistical optimization, the system may skip the next steps (e.g., steps 708-710) related to statistical optimization.

At operation 708, table-granular and partition-granular statistics of objects, such as tables, referenced in the initial query plan for identified predicates may be collected and calculated. The statistics may be collected from respective EP files stored in a metadata database, as described above. For example, partition-granular selectivity estimation may be calculated using the techniques described herein (e.g., formula 1).

Two or more partitions of a table may be used to generate partition-granular selectivity estimation. A subset of partitions may be used to generate the selectivity estimation, and not all partitions of a table may be used to generate partition-granular selectivity estimation for that table. The subset of partitions may be randomly selected.

In some embodiments, an early stopping mechanism may be implemented to stop the selectivity estimation calculation using partition-granular statistics. For example, if the selectivity estimation calculation using partition-granular statistics for a certain number of consecutive partitions is within a threshold value of the table-granular selectivity estimation, the system may stop the selectivity estimation calculation partition-granular statistics and simply use the table granular selectivity estimation to save on compilation time overhead. Here, partition-granular selectivity estimation may be performed in an iterative, additive fashion.

Figure 8:
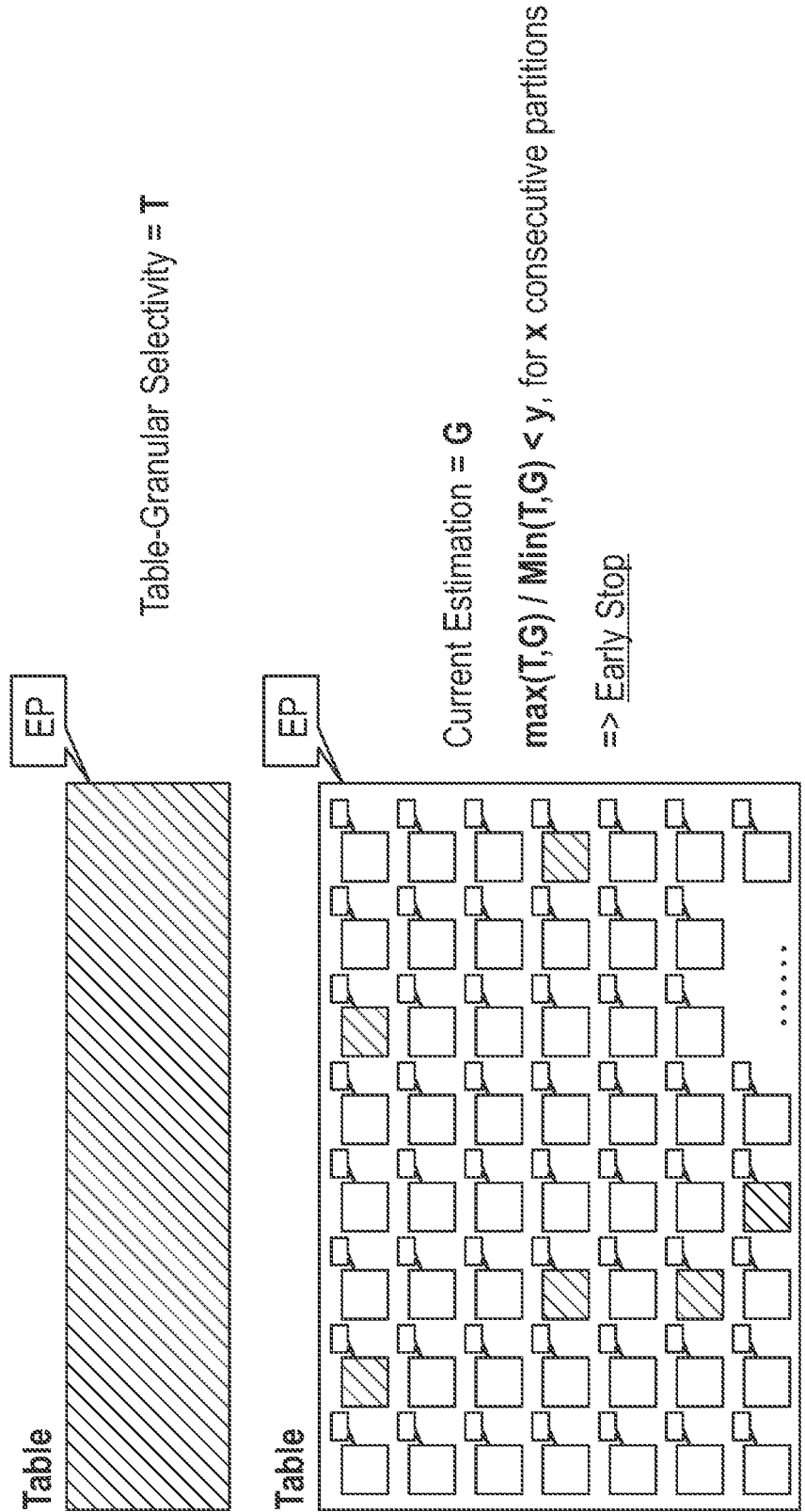
FIG. 8 illustrates an example of an early stopping mechanism, according to some example embodiments.

FIG. 8 illustrates an example of an early stopping mechanism, according to some example embodiments. For this example, consider a table with a plurality of partitions. The table and the plurality of partitions have respective EP files storing relevant statistics. A table-granular selectivity estimation (T) may be calculated. An initial partition-granular selectivity estimation (G) may be calculated using an initial subset of the plurality of partitions. The number of partitions in the initial set may be a configurable parameter. The partitions in the initial set may be randomly selected. The initial partition-granular selectivity estimation (G) may be calculated using the techniques described herein (e.g., formula 1).

The initial partition-granular selectivity estimation (G) may be compared to the table-granular selectivity estimation (T). Based on the comparison and the size of the initial set of partitions, further calculations of the partition-granular selectivity estimation (G) may be stopped, and the table-granular selectivity estimation (T) may be used for query optimization.

If further calculations of partition-granular selectivity estimation (G) are continued, one or more partitions may be randomly selected and added to the calculation of the partition-granular selectivity estimation (G). The current partition-granular selectivity estimation (G) may be compared to the table-granular selectivity estimation (T). If the partition-granular selectivity estimation (G) is within a certain threshold of the table-granular selectivity estimation (T) for a certain number of consecutive partitions, the system may stop the calculation of the partition-granular selectivity estimation (G), and the table-granular selectivity estimation (T) may be used for query optimization. For example, the comparison of partition-granular selectivity estimation (G) and the table-granular selectivity estimation (T) to initiate early stopping may be represented by:

$$\frac{(T, G)}{(T, G)} < y, \text{ for } x \text{ consecutive partitions}$$

where y is a configurable threshold value and x is a configurable whole number.

In some embodiments, a time limit may be set for the calculation of partition-granular selectivity estimation for respective predicates. If a predicted time for calculating partition-granular selectivity estimation with a minimum number of partitions exceeds the total time limit, the system may stop calculation of the partition-granular selectivity estimation and use the table-granular selectivity estimation. For example, consider an example where a total time limit may be set for 200 ms for calculating partition-granular selectivity estimation with a minimum number of partitions. During calculation of the partition-granular selectivity estimation, the system may determine that calculation for the first 10 partitions is taking 10 ms, and the minimum number of partitions is 300. Then, the predicted time is 300 ms (10 ms×300 partitions), which exceeds the total time limit of 200 ms. Therefore, the system may stop the calculation of the partition-granular selectivity estimation early and use the table-granular selectivity estimation to save on compilation overhead.

In some embodiments, the partitions selected for partition-granular selectivity estimation may be chosen based on their properties and the respective predicate. The partitions may be selected based on information in their respective EP files. For example, if certain partition property values of some partitions are skewed in their EP values, the skewed values may impact calculating partition-granular selectivity estimation. For example, a partition can be defined as skewed in its range if the ratio of its value interval to the table's value interval is smaller than a configurable threshold (e.g., 0.8). A similar technique can be used to detect skews in null values. For skewed partitions, the system may determine partition-granular selectivity estimation as described herein. However, for non-skewed partitions, the system may use table-granular selectivity estimation to save compilation time.

Returning to the discussion of FIG. 7, after the relevant table-level and partition-level statistics have been collected and calculated, the initial query plan may be modified based on the relevant table-level and partition-level statistics to generate an optimized (modified) query plan at operation 710. For example, the relevant table-level and partition-level statistics, such as partition-granular selective estimations, may be used to better select join orders as compared to when only table-granular selectivity estimation is used.

Figure 9A:
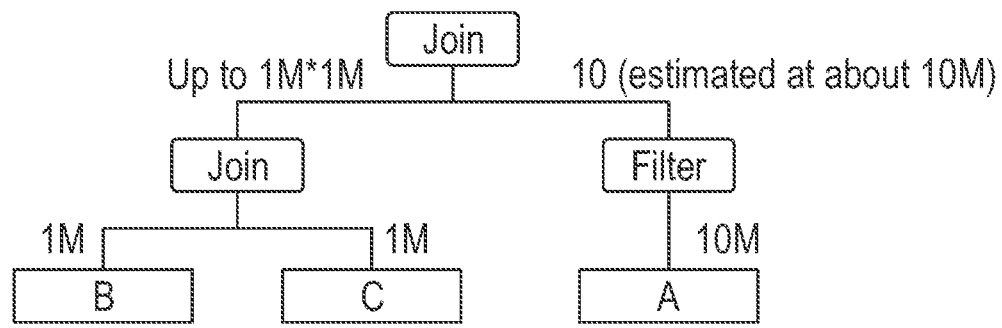
FIGS. 9A-9B illustrate an example of a query plan using partition-granular selectivity estimation as compared to table-granular selectivity estimation, according to some example embodiments.
Figure 9B:
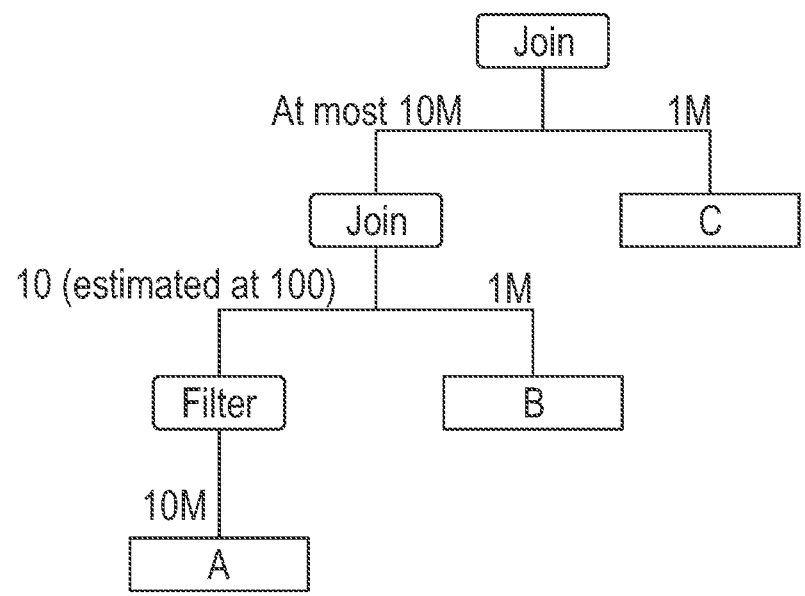

FIGS. 9A-9B illustrates an example of a query plan using partition-granular selectivity estimation as compared to table-granular selectivity estimation, according to some example embodiments. In this example, a query references three tables: table A with size of 10 million rows (or tuples), table B with size of 1 million rows, and table C with a size of 1 million rows. Consider a query: Select * from A, B, C where A.a=B.a and B.b=C.b and A.x between 1 and 999999. Also, consider the following statistics for the column x of table A: min=1 and max=1000000. Therefore, for the table-granular selectivity estimation (TA) for table A for the predicate A.x between 1 and 999999 would be 0.999999. However, table A may have a large value skew where most of the values of A.x are 1000000. Therefore, the partition-granular selectivity estimation (GA) for table A for the same predicate A.x between 1 and 999999 would be 0.00001.

FIG. 9A shows a sample query plan of the above query not using partition-granular selectivity estimation. Here, tables B and C are joined first, and the results of that join are joined with the filtered results of table A, because it was estimated that the filter for table A would result in about 10 million rows based on the table-granular selectivity estimation of table A. However, that estimate was a gross overestimate, as discussed above. Hence, joining B and C resulted in possibly 1M*1M intermediate results, a very large set of intermediate results, which would lead to large computational costs and slow query processing times.

FIG. 9B shows a sample query plan of the same query using partition-granular selectivity estimation. Here, based on the more accurate estimate of the filtered results of table A at 100 estimated results (actual result being 10), the join order is different in that the filtered results of table A are joined with table B first, which are then joined with table C. Thus, the query plan using partition-granular selectivity estimation offers a more optimized query plan leading to faster query processing times.

Even if there are only two tables in a join operation of a query, the more accurate partition-granular selectivity can improve the processing of the join operation. To execute a join operation, one table is designated as the build table and the other table is designated as the probing table. An index is created based on the build table and is used to look for matches in the probing table. Building the index can be computationally expensive depending on the number of rows (tuples) in the build table. Therefore, if the number of relevant rows based on a predicate are misestimated, the selection of the build table and the probing table may be impacted, leading to unnecessary computations. Hence, the selection of the build table and the probing table may be based on the partition-granular selectivity estimations to improve performance of join operations.

Returning to the discussion of FIG. 7, at operation 712, the optimized query plan may be executed to generate results of the statement (e.g., query). For example, the compute service manager (e.g., job coordinator therein) may create jobs based on the optimized query plan and may assign the jobs to one or more XPs for execution.

Figure 10:
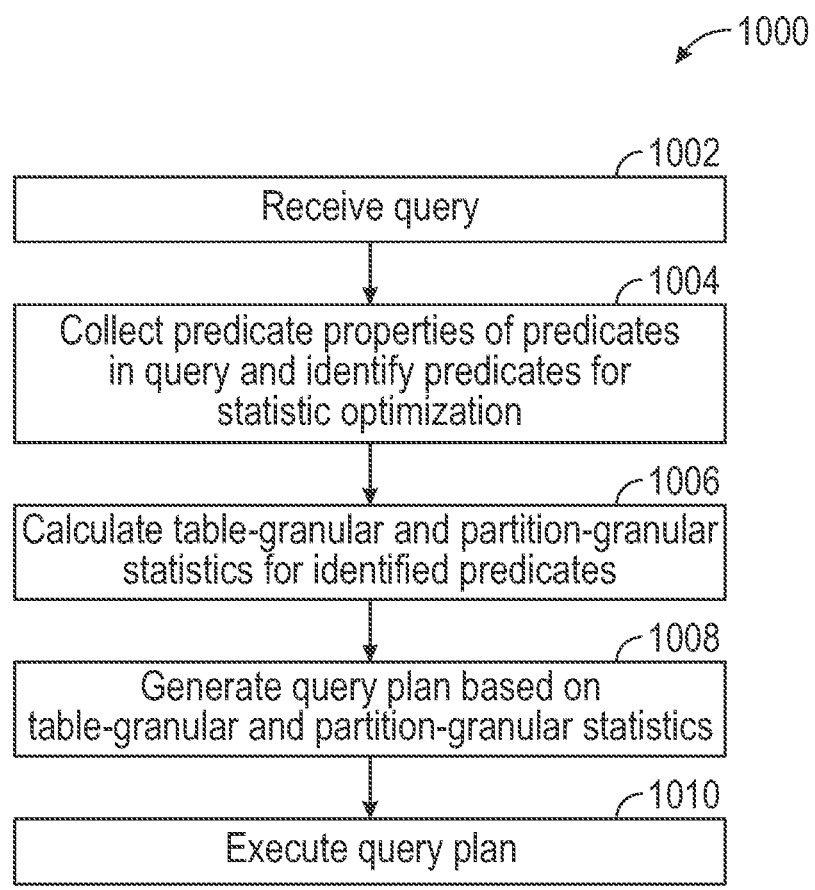
FIG. 10 illustrates a flow diagram of a method 1000 for executing a query using partition-granular selectivity, according to some example embodiments.

In some embodiments, the system may use partition-granular statistics directly when generating the initial query plan. FIG. 10 illustrates a flow diagram of a method 1000 for executing a query using partition-granular selectivity, according to some example embodiments. At operation 1002, a statement to be executed is received by a compute service manager. The statement can be a query, DML statement, or the like.

At operation 1004, predicate properties of predicates in the query may be collected and predicates whose processing can be optimized using statistics may be identified, as described herein. At operation 1006, table-granular and partition-granular statistics of objects, such as tables, referenced in the query for identified predicates may be collected and calculated, as described herein. At operation 1008, a query plan based on the relevant table-level and partition-level statistics may be generated, as described herein. For example, the relevant table-level and partition-level statistics may be used to better select join orders as compared to when only table-granular selectivity estimation is used, as described herein. At operation 1010, the query plan may be executed to generate results of the statement (e.g., query). For example, the compute service manager (e.g., job coordinator therein) may create jobs based on the query plan and may assign the jobs to one or more XPs for execution.

Additional mechanisms can be used to reduce compilation time overhead. In some embodiments, EP files may be cached for faster retrieval. Selectivity estimations may be cached, too. In some embodiments, batch computation of selectivity estimations can be performed. For example, batch computation of multiple predicates can be performed in one iteration over multiple partitions.

Figure 11:
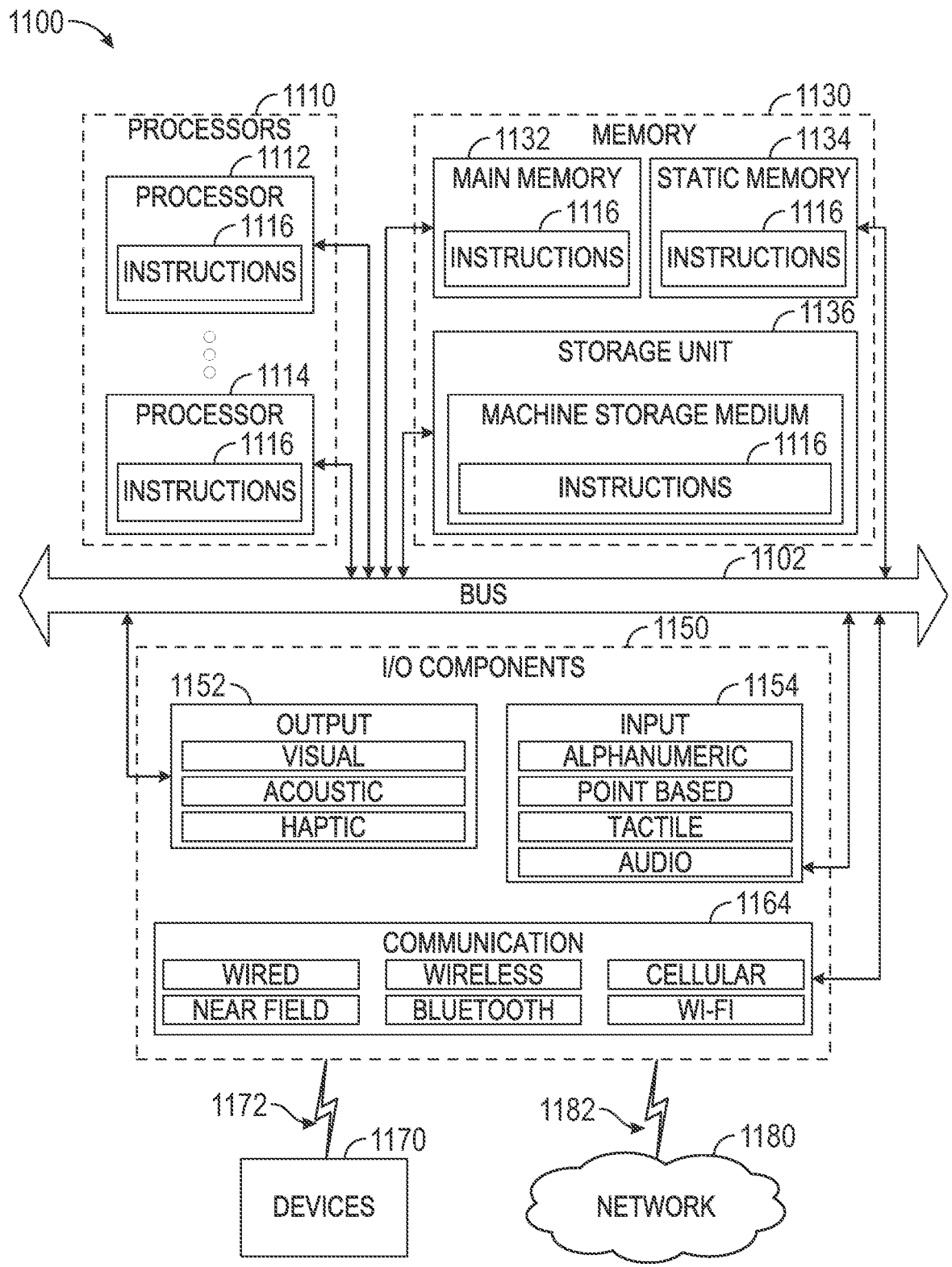
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute any one or more operations of any one or more of the methods described herein. As another example, the instructions 1116 may cause the machine 1100 to implement portions of the data flows described herein. In this way, the instructions 1116 transform a general, non-programmed machine into a particular machine 1100 (e.g., the remote computing device 106, the access management system 118, the compute service manager 112, the execution platform 114, the access management system 110, the Web proxy 120, remote computing device 106) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, and other communication components to provide communication via other modalities. The devices 1170 may be another machine or any of a wide variety of peripheral devices (e.g., a peripheral device coupled via a universal serial bus (USB)). For example, as noted above, the machine 1100 may correspond to any one of the remote computing device 106, the access management system 118, the compute service manager 112, the execution platform 114, the access management system 110, the Web proxy 120, and the devices 1170 may include any other of these systems and devices.

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: receiving a query referencing a table stored in a network-based data system, the table including a plurality of partitions, the query including at least one predicate; retrieving statistics regarding the plurality of partitions of the table; generating a partition-granular selectivity estimate for the at least one predicate based on the retrieved statistics; generating a query plan based on the partition-granular selectivity estimate; and executing the query plan to generate results of the query.

Example 2. The method of example 1, wherein generating the partition-granular selectivity estimate is based on the selectivity estimation of at least two partitions of the plurality of partitions and based on a number of rows in the at least two partitions.

Example 3. The method of any of examples 1-2, wherein the at least two partitions are randomly selected.

Example 4. The method of any of examples 1-3, wherein the at least two partitions are selected based on skews in statistical properties of the at least two partitions.

Example 5. The method of any of examples 1-4, further comprising: generating an initial query plan, wherein the query plan is a modified query plan based on the initial query plan and the partition-granular selectivity estimate.

Example 6. The method of any of examples 1-5, wherein the table is a first table, and wherein modifying the initial query plan includes changing a join order of the first table with a second table and a third table.

Example 7. The method of any of examples 1-6, wherein the table is a first table, and wherein modifying the initial query plan includes changing a join order of the first table with a second table including selection of the first table or the second table as a build table.

Example 10. A system comprising: one or more processors of a machine; and a memory storing instructions that, when executed by the one or more processors, cause the machine to perform operations implementing any one of example methods 1 to 7.

Example 11. A machine-readable storage device embodying instructions that, when executed by a machine, cause the machine to perform operations implementing any one of example methods 1 to 7.

What is claimed is:

1. A method comprising:
receiving a query including at least one predicate referencing a table stored in a network-based data system, the table including a plurality of partitions, respective partitions of the plurality of partitions including a group of rows and at least one partition of the plurality of partitions being created in response to new data being written to the table, the at least one partition replacing an older partition;
retrieving statistics regarding the plurality of partitions of the table;
generating a partition-granular selectivity estimate for the at least one predicate based on the retrieved statistics;
generating a query plan based on the partition-granular selectivity estimate; and
executing the query plan to generate results of the query.

2. The method of claim 1, wherein generating the partition-granular selectivity estimate is based on the selectivity estimation of at least two partitions of the plurality of partitions and based on a number of rows in the at least two partitions.

3. The method of claim 2, wherein the at least two partitions are randomly selected.

4. The method of claim 2, wherein the at least two partitions are selected based on skews in statistical properties of the at least two partitions.

5. The method of claim 1, further comprising:
generating an initial query plan, wherein the query plan is a modified query plan based on the initial query plan and the partition-granular selectivity estimate.

6. The method of claim 5, wherein the table is a first table, and wherein modifying the initial query plan includes changing a join order of the first table with a second table and a third table.

7. The method of claim 5, wherein the table is a first table, and wherein modifying the initial query plan includes changing a join order of the first table with a second table including selection of the first table or the second table as a build table.

8. A machine-storage medium embodying instructions that, when executed by a machine, cause the machine to perform operations comprising:
receiving a query including at least one predicate referencing a table stored in a network-based data system, the table including a plurality of partitions, respective partitions of the plurality of partitions including a group of rows and at least one partition of the plurality of partitions being created in response to new data being written to the table, the at least one partition replacing an older partition;

retrieving statistics regarding the plurality of partitions of the table;

generating a partition-granular selectivity estimate for the at least one predicate based on the retrieved statistics;

generating a query plan based on the partition-granular selectivity estimate; and executing the query plan to generate results of the query.

9. The machine-storage medium of claim 8, wherein generating the partition-granular selectivity estimate is based on the selectivity estimation of at least two partitions of the plurality of partitions and based on a number of rows in the at least two partitions.

10. The machine-storage medium of claim 9, wherein the at least two partitions are randomly selected.

11. The machine-storage medium of claim 9, wherein the at least two partitions are selected based on skews in statistical properties of the at least two partitions.

12. The machine-storage medium of claim 8, further comprising:

generating an initial query plan, wherein the query plan is a modified query plan based on the initial query plan and the partition-granular selectivity estimate.

13. The machine-storage medium of claim 12, wherein the table is a first table, and wherein modifying the initial query plan includes changing a join order of the first table with a second table and a third table.

14. The machine-storage medium of claim 12, wherein the table is a first table, and wherein modifying the initial query plan includes changing a join order of the first table with a second table including selection of the first table or the second table as a build table.

15. A system comprising:

at least one hardware processor; and at least one memory storing instructions that, when executed by the at least one hardware processor, cause the at least one hardware processor to perform operations comprising:

receiving a query including at least one predicate referencing a table stored in a network-based data system, the table including a plurality of partitions, respective partitions of the plurality of partitions including a group of rows and at least one partition of the plurality of partitions being created in response to new data being written to the table, the at least one partition replacing an older partition;

retrieving statistics regarding the plurality of partitions of the table;

generating a partition-granular selectivity estimate for the at least one predicate based on the retrieved statistics;

generating a query plan based on the partition-granular selectivity estimate; and executing the query plan to generate results of the query.

16. The system of claim 15, wherein generating the partition-granular selectivity estimate is based on the selectivity estimation of at least two partitions of the plurality of partitions and based on a number of rows in the at least two partitions.

17. The system of claim 16, wherein the at least two partitions are randomly selected.

18. The system of claim 15, wherein the at least two partitions are selected based on skews in statistical properties of the at least two partitions.

19. The system of claim 15, the operations further comprising:

generating an initial query plan, wherein the query plan is a modified query plan based on the initial query plan and the partition-granular selectivity estimate.

20. The system of claim 19, wherein the table is a first table, and wherein modifying the initial query plan includes changing a join order of the first table with a second table and a third table.

21. The system of claim 19, wherein the table is a first table, and wherein modifying the initial query plan includes changing a join order of the first table with a second table including selection of the first table or the second table as a build table.

* * * * *